Jan. 11, 1955  H. A. SHABAKER  2,699,248
METHOD AND APPARATUS FOR HANDLING GRANULAR MATERIAL
Filed Dec. 8, 1951
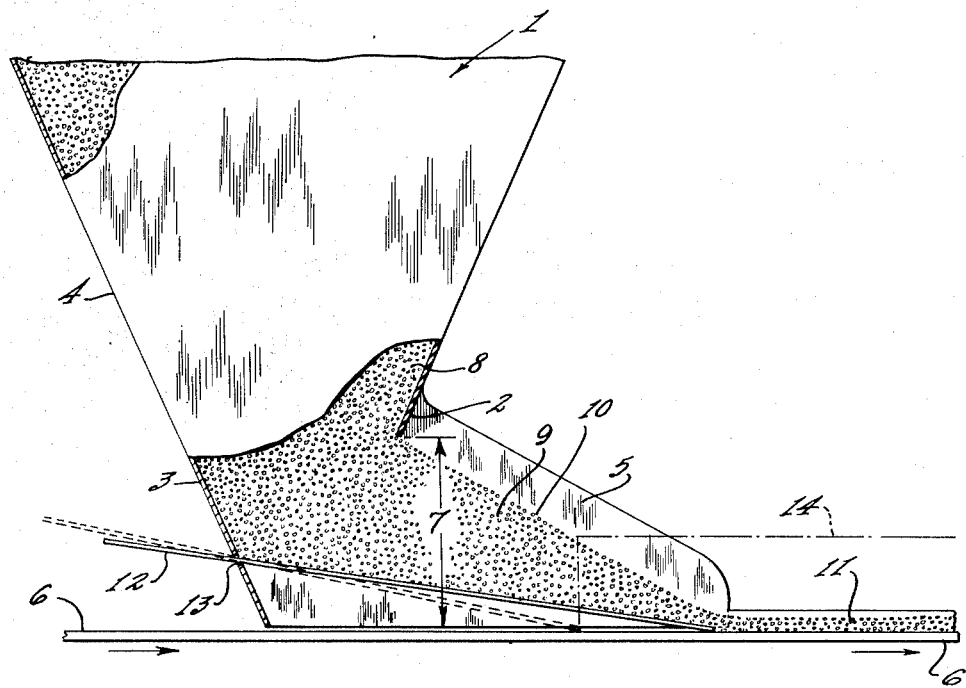
INVENTOR
*Hubert A. Shabaker*
BY
*William Klahunde*
ATTORNEY

United States Patent Office 2,699,248
Patented Jan. 11, 1955

2,699,248

METHOD AND APPARATUS FOR HANDLING GRANULAR MATERIAL

Hubert A. Shabaker, Media, Pa., assignor to Houdry Process Corporation, Wilmington, Del., a corporation of Delaware Application December 8, 1951, Serial No. 260,594

3 Claims. (Cl. 198—56)

This invention relates to a method and apparatus for handling granular material in general, and particularly granular contact material, such as catalyst beads or pellets of the type commonly employed in hydrocarbon conversion processes. More particularly, the invention is concerned with a method and apparatus for depositing the granular material as a substantially uniform layer upon a supported moving surface, such as a continuously moving belt or tray. The invention may be applied to various processes, but is especially suited for feeding granular material, such as catalyst beads or pellets, onto moving trays or belts which form part of a material conditioning system. A typical and advantageous application is found in drying systems, wherein granular material is conveyed horizontally through a drying zone as a relatively thin layer on either a single moving surface or on a plurality of moving surfaces arranged in a vertical tier, the particles being transferred by gravity flow from one moving surface to the other downwardly through the system.

One of the problems encountered in the feeding of granular material from a compact moving mass contained within a supply hopper onto the surface of a moving belt or tray, especially when a relatively thin layer of solids is to be deposited on the moving surface, is that the necessity for providing openings at the bottom of the hopper large enough to prevent stoppage of the flow of particles, such as by bridging within the hopper, precludes the use of greatly restricted openings for the discharging material.

It has therefore been a common practice to provide a discharge opening between the moving surface and the lower end of the hopper which will permit a discharge of material in excess of the amount required to deposit a uniform layer of the desired depth, and to additionally provide a leveling device which will engage the deposited material as it is carried forward by the moving surface and reduce its level to the depth required. Where a separate leveling device is to be employed, the material may be discharged from an opening in the bottom of the hopper disposed at a level somewhat higher than the desired level of the layer, and the material may be carried forward to the leveling device as a relatively deep pile, the leveling device then serving to both spread and level the granular material.

It is also known practice to discharge the granular material through a narrow elongated opening at the bottom of a hopper which extends transversely over the moving surface and has at least its lower forward edge disposed at the desired level. In such latter arrangement, the rear and side lower edges of the hopper may be at the same level, or may terminate at a common lower level immediately adjacent the moving surface. In either case, the granular material will normally be carried forward on the moving surface as a layer whose depth is determined by the vertical gap between the forward lower edge of the hopper and the moving surface, provided, however, that such gap is controlling on the rate of discharge from the hopper, and the mass rate of deposition of said material is independent of the linear velocity of said moving surface. Such devices, however, have certain disadvantages. For example, when depositing relatively thin uniform layers of material, they are likely to cause increased attrition of the particles by forcing such material into a wedged condition between the forward lower edge of the hopper and the moving surface, or between low-clearance leveling devices and the moving surface.

It is an object of the present invention, therefore, to provide a method for feeding granular material onto a moving surface as a uniform layer of adjustable depth without attendant bridging of the material, or without crushing while passing the same under a rigidly fixed leveling device. A further object is to provide for the direct feeding onto a moving surface of granular material in the form of a relatively thin layer.

In accordance with the invention, the granular material is passed downwardly as a compact moving mass through a confined zone terminating directly over the moving surface, the material discharging therefrom laterally onto a horizontally adjustable supporting surface to form a pile having an exposed surface inclined at the angle of repose. The supporting surface is so arranged that, when it is advanced longitudinally to its most forward position in the direction of movement of said moving surface, it supports at rest the entire pile of material discharged from said confined zone; and, when it is retracted, it permits only the forward portion of said pile to be deposited upon and carried forward by said moving surface. The linear velocity of the moving surface is maintained within a range such that the mass rate of deposition of the material is independent of the velocity of the moving surface, thereby fixing the depth of the deposited layer at the vertical depth of the pile at the forward edge of the supporting surface.

In a preferred embodiment of the invention, the granular material is passed downwardly as a compact moving mass within a storage hopper having, along its forward lower edge, a discharge opening contiguous to and extending over substantially the entire width of the moving surface upon which the material is to be deposited. The hopper is provided with an adjustable bottom closure which preferably forms at its forward edge the lowermost boundary of the discharge opening. The bottom closure is extensible in the direction of movement of the moving surface to a limiting point a substantial distance beyond the discharge opening at the forward side of the hopper.

The bottom closure of the hopper may comprise a movable plate member which is arranged to slide longitudinally with respect to the path of the moving surface a substantial distance forward of the discharge opening, its maximum extension being to the transverse line where it intersects a transverse plane inclined at the normal angle of repose of the granular material and passing through the upper horizontal edge of the discharge opening.

The movable bottom of the hopper may be either a horizontal plate member arranged to slide in suitable guideways extending longitudinally along each side of the hopper, or it may be an inclined plate member which is slideable through a horizontal slot extending across the rear wall of the hopper at a substantial distance above the moving surface, the forward end of the movable member resting upon or being supported close to the moving surface. With the latter arrangement, the angle between the movable bottom of the hopper and the moving surface naturally increases as the bottom is drawn backwardly through the guide-slot extending across the rear wall of the hopper.

Other arrangements suitable for achieving the same purpose are, of course, possible. The important consideration is that the adjustable bottom closure of the hopper shall at all times support at least a substantial major portion of the column of material within the hopper. Accordingly, the rearward limit of movement for the bottom of the hopper should be approximately to a line across the path of travel directly below the uppermost horizontal boundary of the opening.

Thus, the sliding bottom of the discharge hopper may be adjustably positioned to cause a cessation of catalyst flow, or to cause the catalyst to be discharged as a layer of any desired thickness, that is, up to a thickness equal to the height of the discharge opening. The speed of the moving surface should be slow enough so that the rate of catalyst withdrawal from the forward edge of the pile by the moving surface will not exceed the maximum flow capacity down the forward slope of the pile.

For a fuller understanding of the invention reference may be had to the accompanying drawing forming a part of this application, in which the single figure of drawing diagrammatically illustrates a discharge hopper associated with a moving surface upon which granular material may be discharged from the hopper as a uniform layer of adjustable depth.

Referring to the drawing, the fragmentary tapering lower end portion of a supply hopper 1, of rectangular configuration in horizontal cross section, is represented as having forward and rear walls 2 and 3, respectively, which converge downwardly, and parallel side walls 4 having forward extensions 5 at their lower ends.

In the particular embodiment illustrated, which shows but one form of apparatus for carrying out the invention, the lower edges of rear wall 3 and the side walls 4, including extensions 5, terminate in a common plane closely adjacent to the moving surface 6 which is to receive the uniform layer of granular material and carry it forward in the direction indicated by the arrows. For the purpose of describing the invention, the moving surface may be considered to be a tray, although the invention is not so limited.

The lower horizontal edge of forward wall 2 of the hopper 1 is spaced a substantial distance above the tray 6, so as to provide a rectangular opening or gap 7 through which the granular material flowing downwardly as a compact moving column 8 within the hopper 1 may discharge forwardly to form a pile 9 having an exposed upper surface 10 inclined at the angle of repose for the particular granular material. The extensions 5 of the hopper side walls 4 are of sufficient height to confine the forwardly moving pile 9 along its sides and cause it to discharge as a layer 11 of the desired width. Although not shown in the diagrammatic illustration of the drawing, the tray 6 may be provided with upturned sides to prevent the layer of granular material from spilling over the longitudinal edges of the moving surface.

A movable bottom 12 is provided at the base of hopper 1 to support the compact column of material therein. The bottom 12 is adapted to slide longitudinally with respect to the path of the moving surface, and has at least its forward edge closely adjacent to the moving surface.

Preferably, the particles of granular material at the base of the compact column 8 are supported by the bottom 12, insted of being discharged downwardly onto the moving surface. In this way, the grinding or shearing effect of forcing the lower portion of the column through the gap 7 against the weight of the material in the hopper is avoided. Only such material as flows forwardly to form the pile 9 may be deposited upon the moving surface. The amount of material which can be deposited as a layer upon the moving surface depends upon the portion of pile 9 which is supported upon the forward end of bottom 12, since the material forming the layer is withdrawn from the forward slope of the pile. In other words, the forward portion of the pile 9 contains a continuously moving well-defined surface layer descending at the angle of repose. The vertical thickness of the moving layer remains substantially the same as it is deflected and carried horizontally forward by the moving surface.

For any given velocity of the moving surface, within the acceptable range, the thickness of the deposited layer 11 will depend upon the position of the movable bottom 12, the thickness of the layer diminishing as the bottom is advanced.

In the drawing, which diagrammatically illustrates but one embodiment of the invention, the movable bottom 12 is supported in an inclined position, with its forward edge resting upon the moving surface and its rear portion extending through and supported within a horizontal slot 13 formed in the rear wall 3 of hopper 1. Slot 13 extends the full width of wall 3 and the bottom member 12 may be slid freely back and forth in relation to the direction of movement of the tray or belt. As the bottom member 12 is withdrawn, the angle it makes with the moving surface increases. For the position of the bottom 12 indicated by full lines in the drawing a layer of catalyst of the depth indicated on the moving belt will be formed. By withdrawing the bottom member 12 until it assumes the angle illustrated by the dotted lines in the drawing, the level of the deposited layer of catalyst upon the moving surface increases until it reaches the level indicated by the broken line 14.

It is to be understood that the invention is not limited to an arrangement in which the bottom of the discharge hopper is adjusted in the manner illustrated in the drawing, nor to an arrangement in which the bottom 12 is inclined to the moving surface. If desired, the bottom 12 may be horizontal, and may be slid back and forth in suitable guideways.

Various other arrangements may be provide at the bottom of the hopper 1 which will serve to support a substantial portion of the column of material descending within the hopper 1. Preferably, however, the bottom 12 of the hopper supports at least a portion of the pile of material 9 which has flowed outwardly from the lower end of column 8 through the available portion of gap 7. It may readily be seen from an inspection of the drawing that if the bottom wall 12 extends forward in the direction of material flow to the transverse line where the plane of repose for the particular granular material intersects the moving surface of member 6, none of the material will flow onto the moving surface, since the bottom 12 will then be supporting the maximum static pile which can be formed beneath the hopper. It is only when the bottom 12 is retracted sufficiently to permit the material flowing through the gap 7 to spread forwardly beyond the front edge of member 12 that continuous feeding of the material will be effected.

As the moving member 6 carries forward the portion of the compact mass of material which has flowed beyond the forward edge of bottom plate 12, additional material flows down the forward slope of the mass 9 retained on the bottom 12 and fills the gap left by the forward movement of material which has been carried along by the moving surface. A more or less static portion of the compact mass, however, remains supported on the bottom plate 12, and is carried slowly forward by the movement of adjacent particles. However, the major portion of the material flowing forward to fill the gap slides down the forward side of the pile 9 as a moving layer. It is apparent therefore, that as the forward edge of the bottom 12 is pushed forwardly, the thickness of the moving layer diminishes.

By means of this invention it is possible to continually flow granular material from a hopper onto a moving surface through a discharge opening of sufficient size to prevent bridging of the particles, while at the same time being able to adjustably control the depth of the layer of material deposited upon the moving surface through a relatively wide range.

It will be obvious to those skilled in the art that the method of the invention is not limited to the specific arrangement of apparatus diagrammatically illustrated in the accompanying drawing. While a discharge hopper having a movable bottom positioned directly over the moving surface and arranged to discharge the granular material only in the direction of movement of the moving surface, as shown in the drawing, is a preferred apparatus for carrying out the invention, it is to be understood that it is not essential that the material discharging from the lower end of hopper 1 be laterally confined in any direction. For example, the material may discharge directly onto an extensive supporting surface positioned directly over and closely adjacent to the moving surface from a discharge opening in the bottom of the storage hopper positioned a substantial vertical distance above the supporting surface, so that the material discharging therefrom flows outwardly in all directions to form a broad pile having an exposed surface inclined at the angle of repose of the particular granular material. The vertical spacing between the upper most perimeter of the discharge opening in the hopper and the supporting surface for the granular material should be so related to the horizontal area of the supporting surface that a pile of material may be retained on the supporting surface having sufficient horizontal extent to prevent further flow of granular material from the supply hopper. Thereafter, in order to feed granular material from the static pile onto the moving surface as a layer of the desired depth, it is necessary only to provide relative horizontal displacement of the pile of granular material with respect to the supporting surface, so that a peripheral bottom portion of the pile is no longer supported by the supporting surface, but flows instead onto the moving surface. Such relative horizontal displacement may be effected either by moving the vertical axis of the pile of material, as by moving the discharge opening, or at least its front edge, forwardly in the direction of movement of the moving surface, or by moving the supporting surface in the opposite direction so that its forward edge recedes from the lower forward edge of the pile, thereby causing material along the forward edge of the pile to slide onto the moving surface. The thickness of the layer deposited upon the moving surface will depend upon the horizontal distance that the normal forward edge of the pile of granular material extends beyond the forward edge of the supporting surface. By varying such horizontal distance, the thickness of the deposited layer of material may be varied. The maximum thickness of the deposited layer will be obtained when the forward edge of the supporting surface is approximately vertically below the lowermost edge of the confining surface from which the material flows forwardly at the angle of repose onto the moving surface.

Obviously many modifications and variations of the invention as hereinbefore set forth may be made without departing from the spirit and scope thereof, and therefore only such limitations should be imposed as are indicated in the appended claims.

What is claimed is:

1. Apparatus for feeding granular material as a layer of uniform depth upon a horizontally moving surface comprising a fixed hopper adapted to laterally confine a supply of said material directly over said moving surface, the lower extremity of the forward wall of said hopper being spaced from said moving surface so as to form therewith a transversely elongated outlet to discharge said material forwardly in the direction of movement of said moving surface as a broad stream of substantial depth, and a horizontally adjustable bottom member slidably supported at the bottom of said hopper and arranged to support said granular material as a compact mass having at least its rearward portion static and having the portion located forward and exteriorly of said outlet supported as a sloping mass having an exposed surface inclined at the angle of repose for said granular material, said bottom member being extensible forwardly from said outlet and having at least its forward edge adapted to move along a plane parallel and closely adjacent to said moving surface, whereby the full forward extension of said bottom member causes said entire mass of granular material to be supported as a static pile, and retraction of said bottom member causes an exposed-surface layer of granular material to flow forwardly and downwardly onto said moving surface, the depth of said layer being determined by the vertical distance between the foremost edge of said bottom member and the inclined exposed surface of said mass.

2. Apparatus as defined in claim 1 in which said bottom member is angularly disposed at an acute angle to said moving surface, said angle being substantially smaller than the angle of repose of said granular material and such as to render said bottom member capable of supporting at least a portion of said granular material as a static mass.

3. Apparatus as defined in claim 2 in which the rearward wall of said hopper is provided with a horizontal slot near its lower end extending substantially the full width of said hopper, and in which said bottom member comprises an elongated thin plate extending through and having its rear end resting upon the lower edge of said slot and having its forward end supported for sliding movement along a path parallel to and closely adjacent to said moving surface.

References Cited in the file of this patent

UNITED STATES PATENTS 1,288,832     Carr                  Dec. 24, 1918